June 30, 1959 — J. J. SHARP — 2,892,270
MOLDBOARD BLADE ATTACHMENT
Filed May 11, 1956 — 2 Sheets-Sheet 1
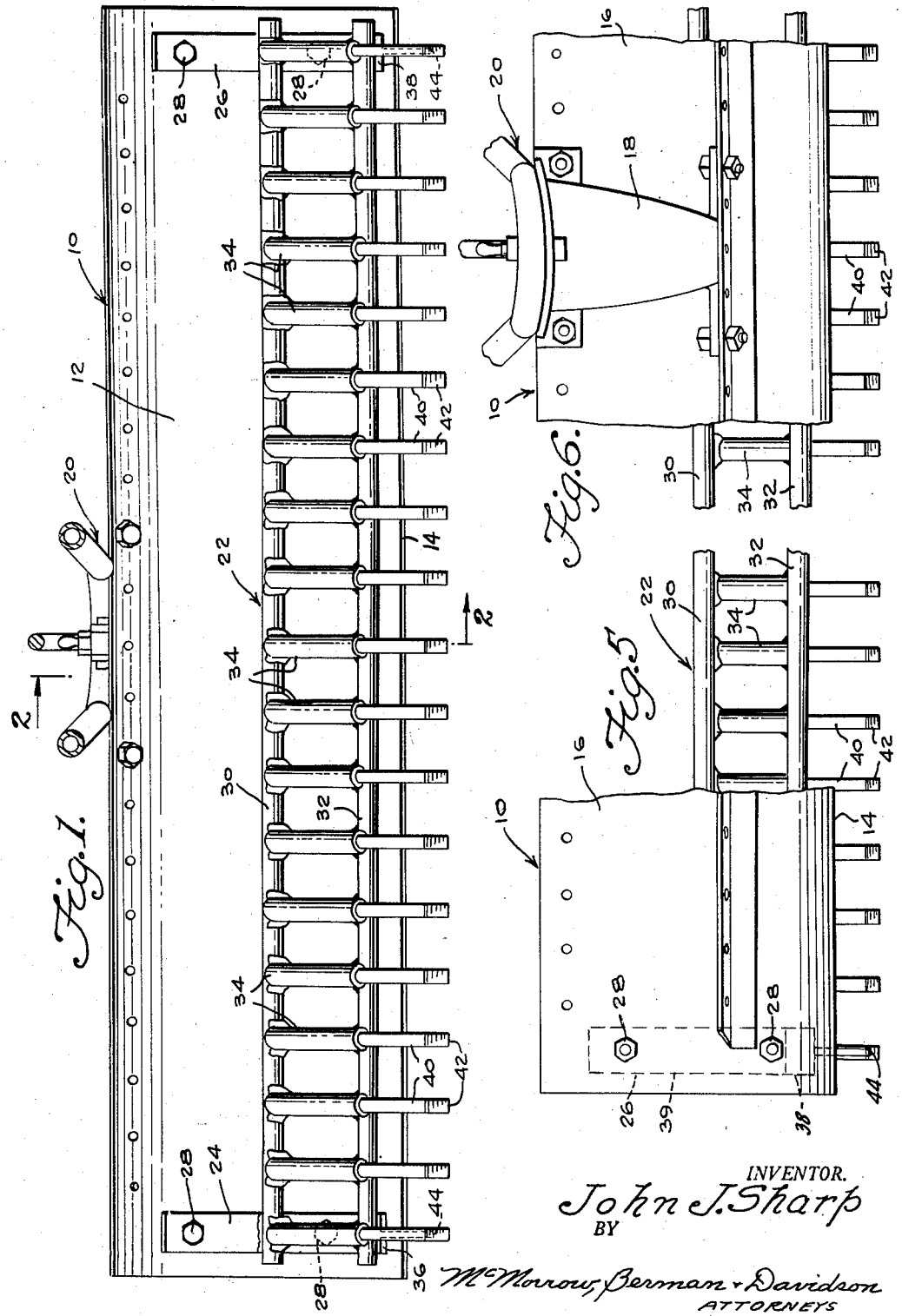
INVENTOR.
John J. Sharp
BY
McMorrow, Berman & Davidson
ATTORNEYS

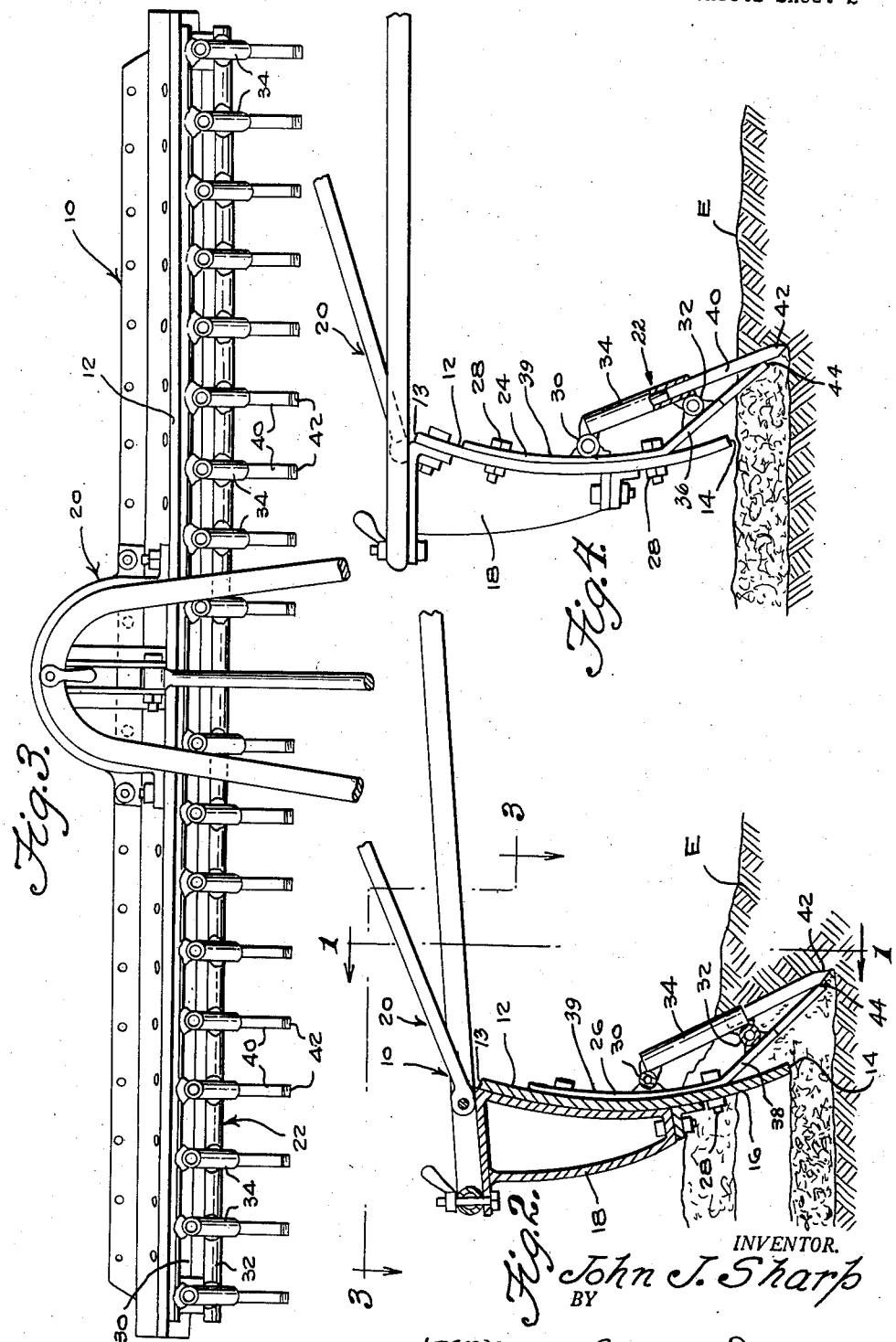

United States Patent Office 2,892,270
Patented June 30, 1959

2,892,270
MOLDBOARD BLADE ATTACHMENT
John J. Sharp, Caseyville, Ill.

Application May 11, 1956, Serial No. 584,213

2 Claims. (Cl. 37—145)

This invention relates to an improved rake attachment for moldboards of tractors and the like.

Use of a moldboard with a tractor for grading or leveling purpose at times is not effective when encountering exceedingly wet grass and exceptionally tough hardpan and it is accordingly desirable to have means on the moldboard for loosening the hardpan or grass in advance of grading or levelling action of the moldboard. Furthermore, moldboards unsupplemented are not especially effective for mixing fertilizer and the like into the earth or for planting crops, without an effective rake attachment reaching below the lower edges of the moldboards.

A primary object of the invention is to provide a more effective rake attachment for moldboards, which has a plurality of longitudinally spaced teeth extending substantially the full length of and projecting below the lower edge of a moldboard at the front side of the moldboard, so that earth is acted upon by the teeth in advance of being acted upon by the moldboard.

Another object of the invention is to provide a rake attachment of this kind which can be made in rugged and serviceable forms at relatively low cost, is easily installed and maintained, and is highly satisfactory, utilitarian and practical for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a front elevational view of a moldboard equipped with a rake attachment in accordance with the present invention, looking from line 1—1 of Figure 2;

Figure 2 is a fragmentary vertical transverse sectional view taken substantially on line 2—2 of Figure 1;

Figure 3 is a plan view looking substantially from line 3—3 of Figure 2;

Figure 4 is an end elevational view of the moldboard and rake attachment thereon, portions being broken away and in section and showing an alternate use of the rake attachment;

Figure 5 is a fragmentary rear elevational view of the moldboard and said rake attachment; and Figure 6 is a fragmentary rear elevational view of the moldboard and novel rake attachment showing the central portion of said mold board.

Referring to the drawings in detail, indicated generally at 10 is a moldboard having an arcuate forward side 12, an upper edge 13, and a lower cutting edge 14. The moldboard has secured centrally on its rear side 16 a vertically elongated mounting plate 18 connectible to a suitable draft assembly indicated generally at 20, which is adapted to be connected to a tractor (not shown).

The illustrated rake attachment 22 comprises a pair of vertically elongated mounting straps 24 and 26 which are removably secured by bolt and nut assemblies 28 on the front side 12 of the moldboard 10 near its opposite ends. The mounting straps 24 and 26 have extending therebetween upper and lower rods 30 and 32, which may be of a tubular cross section if desired, opposite end portions of the rods being secured to the forward sides of the mounting straps by means of welding, for example. As seen in Figures 2 and 4, the mounting straps 24 and 26 have forwardly declining lower portions 36, 38 and upper portions 39, respectively. The upper rod 30 is secured to intermediate parts of the upper strap portions 39 and the lower rod 32 is secured to an intermediate part of the lower strap portions 36 and 38.

A plurality of laterally spaced vertical and forwardly declining sleeves 34 are located in front of the rods 30 and 32 and are secured at their upper and lower ends thereto. Teeth 40 have their upper ends engaged in the sleeves 34 and have chisel lower ends 42 projecting below the sleeves. The lower forward ends 44 of the lower mounting strap portions 36 and 38 engage the rearward sides of the adjacent teeth 40 at the lower ends 42 thereof, for bracing such teeth.

As indicated in Figure 2, the device of the invention, including the moldboard 10 and the rake attachment having been lowered by means of the draft structure 20 into the earth E, with the lower edge 14 of the moldboard disposed below the surface of the earth and with the teeth 40 extending forwardly and downwardly in the earth, forward movement of the device will break up the earth prior to the same being levelled by the lower edge of the moldboard, and relatively solid clumps of earth which accumulate ahead of the moldboard will be engaged and crushed against the front side 12 of the moldboard 10 between the sleeves 34 and the rods 30 and 32 and be broken up. When desired, the moldboard 10 may be used in an elevated position, as shown in Figure 4, wherein only the teeth 40 are engaged in the earth, such disposition of the device facilitating the mixing of fertilizer in the earth as well as mixing seed or crops such as oats, rye, etc.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed is:

1. A moldboard comprising a blade having opposite ends, an upper edge, a lower cutting edge, and a concave forward side, a vertically elongated mounting strap removably secured to the forward side of the blade at each end of the blade, said straps having forwardly declining lower portions reaching forwardly and downwardly beyond the lower cutting edge of the blade and having lower ends, an upper horizontal rod extending between and secured to the mounting straps on a level above said lower cutting edge, a lower horizontal rod extending between and secured to said lower portions of the mounting straps on a level between said upper rod and said lower cutting edge, laterally spaced substantially vertical sleeves having upper and lower ends, the upper ends of said sleeves being secured to said upper rod with the sleeves in forwardly declining positions, the lower ends of the sleeves being secured to said lower rod, and teeth having upper portions receivably engaged in the lower ends of the sleeves and lower chisel ends reaching below the cutting edge of the blade, the lower end of each of said straps engaging the rearward side of the adjacent tooth near its chisel lower end.

2. A moldboard according to claim 1 which includes in addition bolts receivably securing said straps on the forward side of the blade.

References Cited in the file of this patent

UNITED STATES PATENTS

| | | |
|---|---|---|
| 2,228,450 | Gaddis | Jan. 14, 1941 |
| 2,285,706 | Gaddis | June 9, 1942 |
| 2,297,677 | Forte | Oct. 6, 1942 |
| 2,632,261 | Ferris | Mar. 24, 1953 |